June 11, 1957  J. G. PANTELLO  2,795,121
CLAMP-ON BUTTER PATTY HOLDER OR JELLY CUP
Filed Aug. 16, 1954
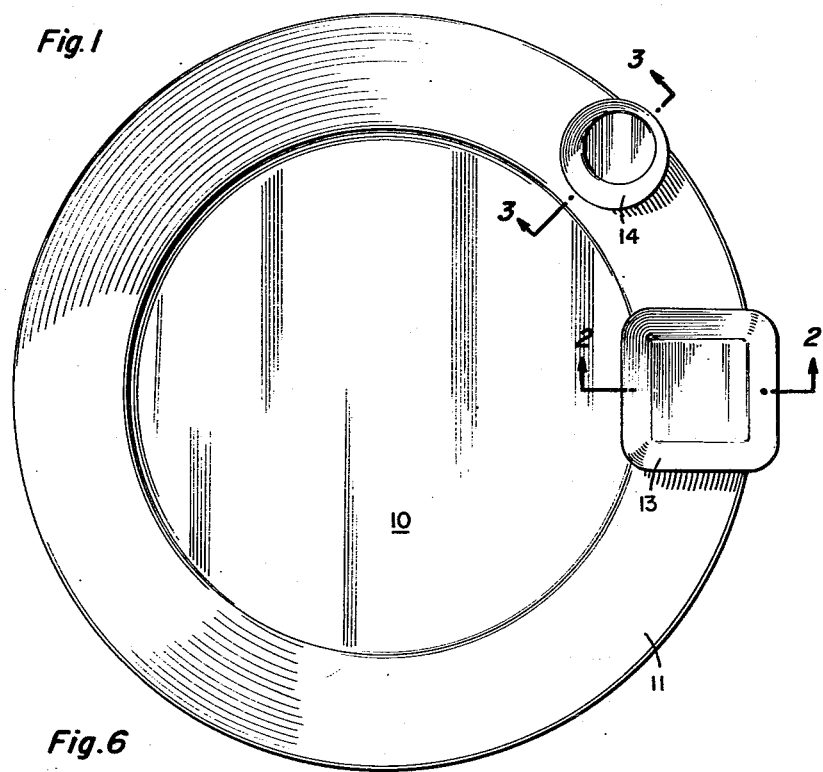
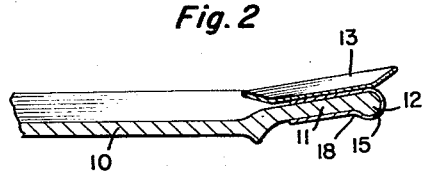
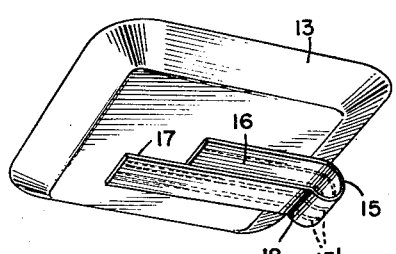
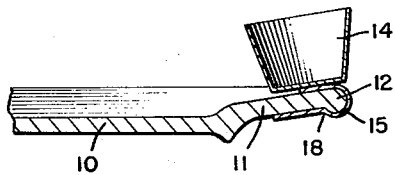
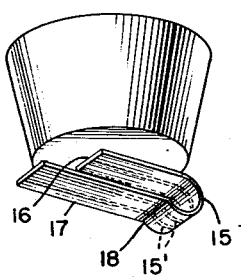
INVENTOR
*J. G. Pantello*
BY
ATTORNEY

United States Patent Office 2,795,121
Patented June 11, 1957

2,795,121

CLAMP-ON BUTTER PATTY HOLDER OR JELLY CUP

James G. Pantello, Washington, Ga., assignor to Chester Cummings

Application August 16, 1954, Serial No. 449,849

2 Claims. (Cl. 65—65)

This invention relates to foods of various kinds and the manner of preparing serving and handling of the same and more particularly to receptacles and equipment utilized in the containing and serving of foods of various kinds at meal time or on other occasions.

This invention is concerned particularly with holders which are relatively small and means for securing them to another object as, for example, on the edge or margin of a larger plate or platter on which foods are served in order to prevent the smaller containers from being accidentally dislodged or dropped where they may be stepped upon, causing accidents and possible injury both to person and property.

Heretofore, small receptacles have been used to contain a patty of butter, a small amount of jelly or other substance and these have been placed unattached on plates, trays, tables and the like and have provided hazards due to the spilling of the contents as well as presenting a problem in the distribution, collection and handling of the same. Efforts have been made to correct this situation by providing platters, plates, trays or the like with circumscribed areas defined by portions of the tray integral with the main body thereof or by having receptacles with some means of attaching them to the edge of plate or platter. These have not been satisfactory on account of the fact that they were expensive, complicated, bulky, heavy and unbalanced the plate or platter to which they were attached.

It is an object of the invention to overcome the disadvantages enumerated and to provide a simple, relatively small, and inexpensive food receptacle and means for removably attaching the same on the rim of a plate.

Another object of the invention is to provide a relatively small container or receptacle for a patty of butter, a small amount of jelly, hors d'oeuvres, condiment or the like with a simple resilient clip by means of which it may be easily and quickly attached to the rim of a plate or removed therefrom, which may be easily washed or sterilized, and which will offer no problem in the care and use of the same.

A further object of the invention is to provide relatively small food containers or receptacles having resilient clips of the simplest character which can be applied to flat-bottomed receptacles of various sizes and configurations.

Other objects and advantages of the invention will be apparent from the following description taken in conjunction with the accompanying drawing wherein:

Fig. 1 is a top plan view of a plate having receptacles for butter and jelly and embodying the invention attached thereto;

Fig. 2, a fragmentary section through the plate and butter dish on the line 2—2 of Fig. 1;

Fig. 3, a fragmentary section through the plate and container for jelly or the like on the line 3—3 of Fig. 1;

Fig. 4, a perspective disclosing the bottom of the butter dish and its attaching clip detached from the supporting plate;

Fig. 5, a perspective disclosing the bottom of the container for jelly or the like and its attaching clip detached from the supporting plate, and Fig. 6 is a cross-section of the lower portion of the attaching clip.

Briefly stated the invention comprises containers or receptacles for foods served in minute quantities, such containers or receptacles being composed of lightweight material impervious to liquids having flat bottoms with upstanding sides either around, flat or of other configuration and with a lightweight resilient substantially U-shaped spring clip with one leg of the U-shaped clip attached to the flat bottom of the receptacle or container in a manner such that the clip will be substantially concealed. The clip is composed of a strip of a width to prevent transverse tipping and is of a size to fit snugly upon and substantially conform to the rim or marginal portion of a plate, platter, saucer, tray or the like.

With continued reference to the drawing, an ordinary dinner plate 10 of paper, chinaware or the like having a rim 11 with thickened outer edge 12 is adapted to have attached thereto a butter dish 13 which may be square as shown or of other shape and a container 14 for jelly or other substance as illustrated particularly in Fig. 1.

The butter dish 13 may be of any desired material and has attached to its bottom surface a resilient clip 15 of a relatively flat strip of flexible sheet material having spaced resilient members 15' such as wires of equal length enclosed between a pair of strips of flexible sheet material of the same length secured together, with legs 16 and 17 with a joint or shoulder 18 which laterally offsets the longer leg from the connecting portion of the clip.

The short leg 16 is of a length sufficient to permit its firm attachment to the butter dish 13 and the leg 17 is of greater length to insure solid engagement with the rim 11 of the plate 10. The flat outer surface of the short leg 16 is attached to the bottom surface of the butter plate 13 by any suitable means such as cement or adhesive or by fusion or in any other desired manner, and the longer end 17 of the clip may be relatively straight so that when applied it will extend along a substantial portion of the under side of the rim and tightly engage and conform to the same as well as snugly encircle the thickened outer edge of the relatively thin plate about which it is applied.

If desired the clip may be made of other materials such as, for example, a strip of spring metal stock but it is preferably of the configuration disclosed.

It will be obvious to those skilled in the art that various changes may be made in the invention, without departing from the spirit and scope thereof, and therefore, the invention is not limited by that which is illustrated in the drawing and described in the specification, but only as indicated in the accompanying claims.

What is claimed is:

1. A food receptacle for attachment upon the outer edge of a supporting dish with an enlarged rim, comprising a food receptacle having a bottom and upstanding wall structure around the same, a spring clip composed of paper strips superimposed one upon the other, spring means between said paper strips, said clip having a pair of relatively flat parallel portions connected by a curved intermediate portion with a shoulder adjacent the connection between said relatively flat parallel portions, the parallel portions of said clip being capable of being spread apart to permit the clip to be snapped over said rim or removed therefrom; one of said parallel portions of said clip being fastened to the under side of said receptacle and the other of said parallel portions extended to provide extended engagement with the rim of the dish on which it is applied.

2. A food receptacle having a flat bottom and upstanding side walls, an attaching spring clip composed of a pair of relatively flat parallel portions connected by a curved intermediate portion with a shoulder adjacent the connection between said parallel portions, said clip being formed of paper strips superimposed one upon the other, a pair of spaced spring members of wire of a length corresponding to said paper strips and disposed between said strips, said receptacle being adapted to be applied to the rim of a plate with said clip enclosing the rim of the plate and snugly retaining the said rim within said clip.

References Cited in the file of this patent

UNITED STATES PATENTS

| | | |
|---|---|---|
| D. 168,690 | Kalt | Jan. 27, 1953 |
| 403,535 | Johnson | May 21, 1889 |
| 463,380 | Dixon et al. | Nov. 17, 1891 |
| 1,212,185 | Cobb | Jan. 16, 1917 |
| 1,596,133 | Wellen | Aug. 17, 1926 |
| 1,644,612 | Roberts | Oct. 4, 1927 |
| 1,762,331 | Greist | June 10, 1930 |
| 1,780,957 | Veder | Nov. 11, 1930 |
| 2,178,274 | Ratner | Oct. 31, 1939 |
| 2,351,107 | Charnysh | June 13, 1944 |
| 2,485,907 | Montoya | Oct. 25, 1949 |

FOREIGN PATENTS

| | | |
|---|---|---|
| 477,509 | Great Britain | Dec. 31, 1937 |
| 480,612 | France | June 6, 1916 |
| 974,419 | France | Sept. 27, 1950 |